(12) United States Patent
Sharratt

(10) Patent No.: US 11,603,433 B2
(45) Date of Patent: Mar. 14, 2023

(54) COMPOUNDS

(71) Applicant: Mexichem Fluor S.A. de C.V., San Luis Potosi (MX)

(72) Inventor: Andrew Sharratt, Runcorn (GB)

(73) Assignee: MEXICHEM FLUOR S.A. DE C.V., San Luis Potosi (MX)

(*) Notice: Subject to any disclaimer, the term of this patent is extended or adjusted under 35 U.S.C. 154(b) by 0 days.

(21) Appl. No.: 17/415,525

(22) PCT Filed: Dec. 20, 2019

(86) PCT No.: PCT/GB2019/053650
§ 371 (c)(1),
(2) Date: Jun. 17, 2021

(87) PCT Pub. No.: WO2020/128504
PCT Pub. Date: Jun. 25, 2020

(65) Prior Publication Data
US 2022/0056206 A1 Feb. 24, 2022

(30) Foreign Application Priority Data

Dec. 21, 2018 (GB) .................................. 1820989
Jul. 16, 2019 (GB) .................................. 1910153

(51) Int. Cl.
*C10M 107/38* (2006.01)
*C08G 65/00* (2006.01)
(Continued)

(52) U.S. Cl.
CPC ....... *C08G 65/007* (2013.01); *C08G 65/2609* (2013.01); *C08G 65/2696* (2013.01);
(Continued)

(58) Field of Classification Search
CPC .............. C08G 65/007; C08G 65/2609; C08G 65/2696; C08G 2650/48; C08G 63/66;
(Continued)

(56) References Cited

U.S. PATENT DOCUMENTS 5,100,569 A 3/1992 Nalewajek et al.
2009/0030175 A1 1/2009 Yamamoto et al.

FOREIGN PATENT DOCUMENTS

EP 2277976 A2 1/2011
JP H07 26279 A 1/1995
(Continued)

OTHER PUBLICATIONS

Sakakibara et al., Regio-controlled ring-opening polymerization of perfluoroalkyl-substituted epoxides, Chemical Communications, vol. 42, No. 31, Jan. 1, 2006, pp. 3334-3336. ISSN: 1359-7345, DOI: 10.1039/b606693c Run 4; table 2 scheme 2.
(Continued)

*Primary Examiner* — Prem C Singh
*Assistant Examiner* — Francis C Campanell
(74) *Attorney, Agent, or Firm* — Crowell & Moring LLP

(57) ABSTRACT

The present invention relates to compounds according to formula (Ia) or formula (Ib);

Formula (Ia)

(Continued)

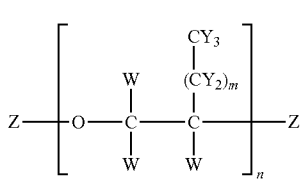

Formula (Ib)

wherein each W is independently selected from the group consisting of H, F, Cl, Br, I and $(CY_2)_m CY_3$; each Y is independently selected from the group consisting of F, Cl, Br and I; each Z is independently selected from the group consisting of H, OH, $(CW_2)_p CW_3$, $CY_3$, $OCW_3$, $O(CW_2)_p CW_3$, $OCW((CY_2)_m CY_3)CWCW_2$, $(CW_2)_p OH$, polyalkylene glycol and polyolester; n is an integer from 2 to 49; m is an integer from 0 to 3; p is an integer from 0 to 9; the molecular weight average ($M_W$) is ≤5500; and the polydispersity index is ≤1.45; compositions comprising these compounds and methods for their production.

28 Claims, 5 Drawing Sheets

(51) Int. Cl.
| | | |
|---|---|---|
| C08G 65/26 | (2006.01) | |
| C10M 171/00 | (2006.01) | |
| C10N 20/00 | (2006.01) | |
| C10N 20/02 | (2006.01) | |
| C10N 20/04 | (2006.01) | |

(52) U.S. Cl.
CPC ...... *C10M 107/38* (2013.01); *C10M 171/008* (2013.01); *C08G 2650/48* (2013.01); *C10N 2020/02* (2013.01); *C10N 2020/04* (2013.01); *C10N 2020/101* (2020.05)

(58) Field of Classification Search
CPC ............ C08G 65/2639; C10M 107/38; C10M 171/008; C10M 2203/02; C10M 2207/042; C10M 2213/043; C10M 2207/023; C10M 2223/04; C10N 2020/02; C10N 2020/04; C10N 2020/101; C10N 2030/06; C10N 2030/70; C10N 2020/099; C10N 2020/097; C08L 71/00
USPC ......................................... 508/582; 528/402
See application file for complete search history.

(56) References Cited

FOREIGN PATENT DOCUMENTS

| WO | WO 2017/098238 A1 | 6/2017 | |
|---|---|---|---|
| WO | WO-2017098238 A1 * | 6/2017 | ............. C09K 21/02 |

OTHER PUBLICATIONS

Trischler et al., Preparation of Fluorine-Containing Polyethers, Journal of Polymer Science Part A-1, vol. 5, Jan. 1, 1967.
Sakakibara et al., Macromolecules vol. 40, 2007, Regioregular polymerization of fluorine-containing epoxides, pp. 6136-6142.
Gervais et al., Pure and Applied Chemistry, vol. 84, No. 10. 2012, Rapid and controlled synthesis of hydrophobic polyethers by monomer activation, pp. 2103-2111.
Umezawa et al., Macromolecules vol. 28, 1995, Copolymerization of 3,3,3-trifluoro-1,2-epoxypropane with 1,2-epoxypropane using organozinc compounds, pp. 833-837.
International Search Report and Written Opinion in Application No. PCT/GB2019/053650, dated Jun. 25, 2020, 14 pages.
International Preliminary Report on Patentability in Application No. PCT/GB2019/053650, dated Jun. 16, 2021, 9 pages.

* cited by examiner

COMPOUNDS

CROSS-REFERENCE TO RELATED APPLICATIONS

This application is the U.S. national stage of international application PCT/GB2019/053650, filed Dec. 20, 2019, which claims priority from GB1910153.4 filed on Jul. 16, 2019 and GB1820989.0 filed on Dec. 21, 2018, the entireties of which are hereby fully incorporated by reference herein.

The present invention relates to compounds, compositions, uses thereof and methods for preparing the same. The compounds of the invention are halogenated polyethers. The compositions of the invention comprise a heat transfer portion and a lubricating portion, wherein the lubricating portion comprises a halogenated polyether. The compositions of the invention may be used in refrigerants and refrigerant blends. The compounds of the invention may be produced by polymerisation of fluorinated epoxides.

The listing or discussion of a prior-published document in this specification should not be necessarily taken as an acknowledgement that the document is part of the state of the art or is common general knowledge.

Fluorocarbon-based compounds are currently used in a large number of commercial and industrial applications, such as propellants, blowing agents and heat transfer fluids. The interest in, and use of, fluorine-based compounds, particularly (hydro)fluoroolefins, as heat transfer fluids has increased as new refrigerants are sought.

Dichlorodifluoromethane (refrigerant R-12) possesses a suitable combination of refrigerant properties and was, for many years, the most widely used refrigerant. Due to international concern that fully and partially halogenated chlorofluorocarbons, such as dichlorodifluoromethane and chlorodifluoromethane, were damaging the earth's protective ozone layer, there was general agreement that their manufacture and use should be severely restricted and eventually phased out completely. The use of dichlorodifluoromethane was phased out in the 1990s.

Chlorodifluoromethane (R-22) was introduced as a replacement for R-12 because of its lower ozone depletion potential. Following concerns that R-22 is a potent greenhouse gas, its use is also being phased out. R-410A and R-407 (including R-407A, R-407B and R-407C) have been introduced as a replacement refrigerant for R-22. However, R-22, R-410A and the R-407 refrigerants all have a high global warming potential (GWP, also known as greenhouse warming potential).

1,1,1,2-tetrafluoroethane (refrigerant R-134a) was introduced as a replacement refrigerant for R-12. However, despite having a low ozone depletion potential, R-134a has a GWP of 1430. It would be desirable to find replacements for R-134a that have a lower GWP.

R-152a (1,1-difluoroethane) has been identified as an alternative to R-134a. It is somewhat more efficient than R-134a and has a greenhouse warming potential of 120. However, the flammability of R-152a is judged too high, for example to permit its safe use in mobile air conditioning systems. In particular its lower flammable limit in air is too low, its flame speeds are too high, and its ignition energy is too low.

R-410A is a non-flammable mixture of R-32 (difluoromethane) and R-125 (pentafluoroethane) in the proportions 50%/50% by weight. It is extensively used as an air-conditioning refrigerant but has a GWP of 2107. It is desirable to find replacements for R-410A that have a lower GWP.

R-32 has been proposed as a lower-GWP replacement for R-410A but it is flammable. In addition, R-32 can exhibit regions of liquid-liquid immiscibility in combination with Polyolester (POE) refrigeration lubricants. R-32 can also exhibit higher solubility in POE lubricants than R-410A, reducing the effective viscosity of the lubricant phase. This can lead system designers to recommend higher viscosity grade lubricant for use with R-32 than with R-410A, which can reduce the compressor efficiency. It would thus be desirable to find a combination of R-32 with lubricant which reduced the flammability, improved mutual miscibility and/or gave an acceptable solubility of refrigerant in lubricant and vice versa.

Carbon dioxide (R-744) is finding increasing use as a refrigerant for stationary and mobile air-conditioning and refrigeration applications. It is commonly used with Polyalkylene Glycol (PAG) lubricants. Conventional PAG lubricants exhibit extensive regions of liquid immiscibility with R-744 which can lead to heat transfer problems in the evaporator of systems using this type of heat transfer composition. It would be advantageous to identify a lubricant which had improved miscibility with R-744 and whose combination with R-744 was an improved heat transfer composition.

PAG lubricants also exhibit hygroscopicity, which in systems using R-744 can lead to formation of carbonic acid and hence system corrosion. It would be advantageous to find a heat transfer composition comprising R-744 with reduced hygroscopicity.

(Hydro)fluoroolefins, particularly tetrafluoropropenes, have been proposed as possible refrigerants for use in a variety of heat transfer devices.

Heat transfer fluids are often used in combination with lubricants, such as in heating and refrigeration systems. Such lubricants are included in heat transfer compositions to ensure continued smooth operation of the heat transfer system.

It is necessary that lubricants used in heat transfer compositions are compatible with the refrigerants in the compositions. The compatibility of the lubricant and the refrigerant is predicated on a number of factors, such as a desire for at least partial miscibility at part of the operating temperature range, a low tendency to degrade or react in use and appropriate viscosities for the application.

However, in much of the prior art on the polymerisation and polymers of trifluoropropylene oxide it is clear that the methods used, and the products produced by these methods would be unsuitable for use in lubricating and heat transfer compositions with refrigerants and refrigerant blends that include (hydro)fluoroolefins.

The polymers produced by these methods often produce solid or very viscous polymers with molecular weights that exceed 50000.

WO 2017/098238 describes compositions which comprise a heat transfer portion and a lubricating portion, wherein the lubricating portion comprises a halogenated polyether. The method to polymerise the fluorinated epoxides described in WO 2017/098238 may not be ideal for exploitation on an industrial scale.

There is, therefore, a need for lubricants that can be used in conjunction with heat transfer fluids for the use in refrigerant systems. In order to match these requirements a lubricant which has a $M_W$ of ≤5500 and a polydispersity index of ≤1.45 is desirable.

There is, therefore, a need for lubricants that can be used in conjunction with heat transfer fluids, both those currently used and those proposed as replacement compositions. In particular, lubricants are desired that are miscible with a wide range of heat transfer fluids, possess an appropriate viscosity, do not reduce the performance of heat transfer fluids and have low flammability; all in addition to successfully functioning as a lubricant.

In addition, there is a need for a method which can produce said polymers without the need for a hazardous initiator and/or solvent, and/or reduce the reaction time from days to hours, and/or enable good control of the properties of the polymers produced.

Lubricants with low flammability are particularly important for heat transfer fluids that are used in air-conditioning applications such as mobile air-conditioning, as such compositions are in danger of coming into contact with hot metal surfaces of the engine. Likewise, in stationary residential air-conditioning applications, it is often the case that the air-conditioning unit is located near to the building's heating furnace and thus if a flammable refrigerant is used in this application there is a risk of leaked heat transfer composition hitting hot furnace surfaces.

The subject invention addresses the above and other deficiencies by the provision of a compound according to formula (Ia) or formula (Ib):

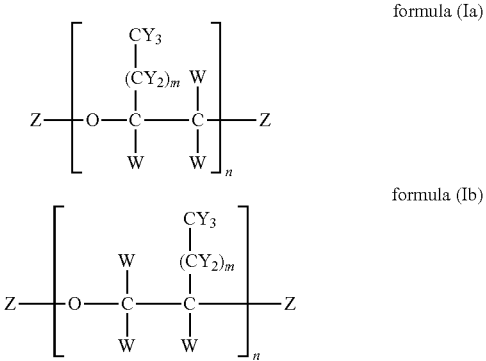

formula (Ia)

formula (Ib)

wherein
each W is independently selected from the group consisting of H, F, Cl, Br, I and $(CY_2)_mCY_3$;
each Y is independently selected from the group consisting of F, Cl, Br and I;
each Z is independently selected from the group consisting of H, OH, $(CW_2)_pCW_3$, $CY_3$, $OCW_3$, $O(CW_2)_pCW_3$, $(CW_2)_pOH$, polyalkylene glycol and polyolester; n is an integer from 2 to 49;
m is an integer from 0 to 3;
p is an integer from 0 to 9;
the molecular weight average ($M_W$) is ≤5500; and
the polydispersity index is ≤51.45.

For example, wherein
each W is independently selected from the group consisting of H, F, Cl, Br and I;
each Y is independently selected from the group consisting of F, Cl, Br and I;
each Z is independently selected from the group consisting of H, OH, $(CW_2)_pCW_3$, $CY_3$, $OCW_3$, $O(CW_2)_pCW_3$, polyalkylene glycol and polyolester;
n is an integer from 2 to 49;
m is an integer from 0 to 3;
p is an integer from 0 to 9;
the molecular weight average ($M_W$) is ≤5500; and
the polydispersity index is ≤1.45.

For example, at least one $(CY_2)_mCY_3$ may be $CF_3$ (i.e.: m=0 and each Y is F).

For example, $(CY_2)_mCY_3$ may be $CF_3$ and at least one W may also be $(CY_2)_mCY_3$. In particular, each $(CY_2)_mCY_3$ group may be $CF_3$.

Examples of compounds of formula Ia and Ib include compounds in which $(CY_2)_mCY_3$ is $CF_3$, one W is $CF_3$ and each other W group is H. Further examples include compounds in which $(CY_2)_mCY_3$ is $CF_3$, one or two groups W are F and one or two W groups are H (e.g. two W groups are H and one W group is F).

When each repeating unit in the compounds of the invention contains two groups $(CY_2)_mCY_3$, such as two $CF_3$ groups, these may be connected to the same carbon atom or adjacent carbon atoms in the chain or backbone.

The compound of formula (Ib) may alternatively be represented by the following formula (Ic):

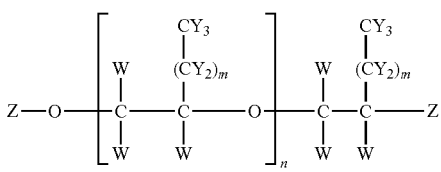

formula (Ic)

The compound of formula (Ia), (Ib) and (Ic) may have a $M_W$ of ≤4000, preferably ≤3000, even more preferably ≤2500.

The compound of formula (Ia), (Ib) and (Ic) may have a polydispersity index of about 1.45, preferably about 1.35, more preferably about 1.30, even more preferably about 1.25.

Y is preferably F or Cl, more preferably Y is F.
W is preferably H, F or Cl. More preferably W is H.
Advantageously, m is an integer from 0 to 3, preferably 0.
n is preferably an integer from 2 to 49, for example 5 to 25, preferably n is an integer from 6 to 20, e.g. 6, 7, 8, 9, 10, 11, 12, 13, 14, 15, 16, 17, 18, 19, 20.

It will be understood that references to formula (I) refer to formula (Ia), formula (Ib) and/or formula (Ic).

In some compounds of formula (I), at least one, and in some cases both, of the Z derivatives are not H or OH.

In some compounds of formula (I), at least one Z derivative may comprise a polyalkylene glycol. Alternatively, both Z derivatives may comprise a polyalkylene glycol (PAG). In both instances, the polyalkylene glycol may be selected from the group consisting of poly(ethylene) oxide, poly (propylene) oxide, and mixtures thereof. In such embodiments, the PAG groups may be conjugated to the compound of formula (I) through the formation of an ester bond between a hydroxyl end-capping group of formula (I) (i.e., Z=OH or Z=$(CW_2)_pOH$) with a carboxylic acid end-capped PAG.

In some compounds of formula (I), at least one Z derivative may comprise a fluorinated-PAG (F-PAG). The F-PAG may be selected from the group consisting of $F_3C—$ end capped PAGs and hydroxyl end capped PAGs.

The hydroxyl end groups of F-PAGs can provide further scope for derivatisation and can, for example, be converted to ether or ester groups. These groups can be aliphatic, aromatic, linear, branched, fluorine containing or functionalised in other ways to allow for further adjustments to the properties of the products.

The inventors have found that when at least one Z derivative comprises a F-PAG, the lubricating properties of the compound of formula (I) may be improved.

In some compounds of formula (I), the Z derivative may, independently, be an alkyl or alkoxy group containing from 1 to 10 carbon atoms.

Both Z derivatives may be the same. Alternatively, both Z derivatives may be different.

p is preferably an integer from 1 to 6, more preferably 2 to 6, for example 3 to 5.

The compound of formula (I) may for example have a viscosity at 40° C. of from about 5 to about 250 cP. The compound of formula (I) may have a viscosity at 40° C. of from about 15 to about 150 cP.

The compound of formula (Ia) may be a compound of formula (IIa):

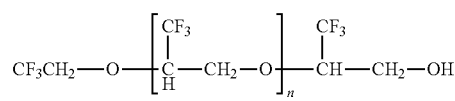

formula (IIa)

The compound of formula (Ib) may be a compound of formula (IIb):

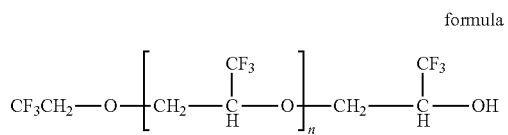

formula (IIb)

Alternatively, or additionally, the compound of formula (Ia) may be a compound of formula (IIIa):

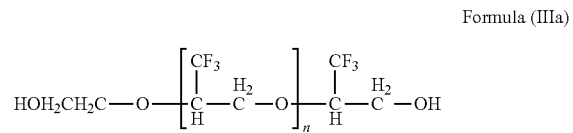

Formula (IIIa)

Alternatively, or additionally, the compound of formula (Ib) may be a compound of formula (IIIb):

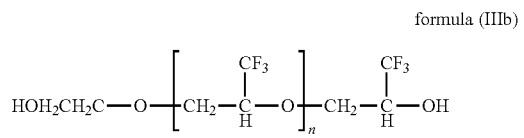

formula (IIIb)

The skilled person will understand that the above formulas are representative only and that it will be appreciated that structural defects may exist in the polymer chains.

A composition may, for example, comprise at least two different compounds of formula (I). In such instances, the value of n may be the same for the at least two compounds of formula (I). Alternatively, the value of n may be different for the at least two compounds of formula (I).

Preferably, the compound of formula (I) is a compound of formula (Ib).

The compound of formula (I) may be a mixture of compounds of formula (Ia) and (Ib). In this situation, it is preferable that the majority of the mixture is a compound of formula (Ib), for example greater than 50% by weight of the mixture is a compound of formula (Ib), preferably greater than 75%, more preferably greater than 90% or 95%.

The compound of formula (I) may be made by a method comprising the polymerisation of an epoxide precursor.

The epoxide precursor preferably has the formula (IV)

formula (IV)

wherein:
$R_1$ is $(CY_2)_mCY_3$;
$R_2$ is H, F, Cl, Br, I or $(CY_2)_mCY_3$;
$R_3$ is H, F, Cl, Br, I or $(CY_2)_mCY_3$;
$R_4$ is H, F, Cl, Br, I or $(CY_2)_mCY_3$.

For example, wherein
$R_1$ is $CF_3$;
$R_2$ is H, F or $CF_3$;
$R_3$ is H, F or $CF_3$;
$R_4$ is H or $CF_3$.

For example, wherein
$R_1$ is $CF_3$;
$R_2$ is H or F;
$R_3$ is H or F;
$R_4$ is H or $CF_3$.

Examples of the epoxide precursors that may be used include an epoxide according to formula (IV), wherein R, is $CF_3$, $R_2$ is H, $R_3$ is H, $R_4$ is H (the epoxide of 3,3,3-trifluoropropene (1243zf)); an epoxide according to formula (IV), wherein, R, is $CF_3$, $R_2$ is F, $R_3$ is H and $R_4$ is H (the epoxide of 2,3,3,3-tetrafluropropene (1234yf)); an epoxide according to formula (IV), wherein R, is $CF_3$, $R_2$ is H, $R_3$ is F, $R_4$ is H (the epoxide of 1,3,3,3-tetrafluoropropene (1234ze)); an epoxide according to formula (IV), wherein R, is $CF_3$, $R_2$ is H, $R_3$ is $CF_3$, $R_4$ is H; an epoxide wherein R, is $CF_3$, $R_2$ is H, $R_3$ is H, $R_4$ is $CF_3$ (the epoxide of 1,1,1,4,4,4-hexafluoro-2-butene (1336mzz)); and an epoxide wherein R, is $CF_3$, $R_2$ is $CF_3$, $R_3$ is H, $R_4$ is H (the epoxide 3,3,3-trifluoro-2-(trifluoromethyl)-1,2-propenoxide (HFIBO)). Preferably the epoxide is the epoxide of 1243zf (1,1,1-trifluoro-2,3-epoxypropane).

The method may comprise the polymerisation of an epoxide using an initiator formed from a base and an alcohol.

Preferably, the base is a group I or group II metal hydroxide, more preferably a group I metal hydroxide, even more preferably sodium or potassium hydroxide, even more preferably potassium hydroxide.

Preferably, the alcohol is a primary alcohol. The primary alcohol may, for example, be a $C_1$ to $C_{10}$ glycol, preferably ethylene glycol. The primary alcohol may, for example, be a $C_1$ to $C_{10}$ branched or straight chain alcohol. The primary alcohol, for example, may be a fluorinated alcohol, for example a $C_1$ to $C_{10}$ fluorinated alcohol, preferably trifluoroethanol.

The polymerisation of the epoxide may be carried out in the absence of solvent.

The polymerisation reaction may be carried out at a temperature of from about 0 to about 130° C., preferably from about 40 to about 100° C., more preferably from about 50 to about 90° C.

The polymerisation reaction may be carried out at a pressure of from about 100 to about 1000.3 kPa, preferably about 101 kPa.

The compound of formula (I) can be used as a lubricant.

The compound of formula (I) may form part of a composition, wherein the compound of formula (I) is the lubricating portion and wherein the composition also comprises a heat transfer portion. Preferably, the composition comprises a single liquid phase across the entire temperature range between −30° C. and 70° C.

The weight percentage of the lubricating portion in the total composition of the invention may, for example, be from about 1 to about 30%, preferably from about 1 to about 10%, more preferably from about 1 to about 5%.

The heat transfer portion may comprise one or more compounds selected from the group consisting of (hydro) fluoroolefins (HFOs), hydrofluorocarbons (HFCs), chlorofluorocarbons (CFCs), hydrochlorofluorocarbons (HCFCs), perfluoroalkyl iodides and hydrocarbons.

The heat transfer portion may, for example, comprise one or more compounds selected from the group of 1,1,2,3,3,3-pentafluoropropene (R-1225ye), 1,3,3,3-tetrafluoropropene (R-1234ze), 2,3,3,3-tetrafluoropropene (R-1234yf), 3,3,3-trifluoropropene (R-1243zf), 1,1,1,2-tetrafluoroethane (R-134a), 1,1-difluoroethane (R-152a), difluoromethane (R-32), fluoroethane (R-161), pentafluoroethane (R-125), 1,1,2,2-tetrafluoroethane (R-134), propane, propylene, carbon dioxide, 1,1,1,3,3-pentafluoropropane (R-245fa), 1,1,1,3,3,3-hexofluoropropane (R-236fa), 1,1,1,2,2-pentafluoropropane (R-245cb), 1,1,1,2,3,3,3-heptafluoropropane (R-227ea), 1,1,1-trifluoroethane (R-143a), n-butane, isobutane and 1,1,1,3,3-pentafluorobutane (R-365mfc), 1,1,2-trifluoroethylene (R-1123), 1,1-difluoroethylene (R-1132a), trifluoromethyl iodide ($CF_3I$), carbon dioxide (R-744), ethane (R-170), ethylene (R-1150), propene (R-1270), propane (R-290), isobutane (R-600a), n-butane (R-600), n-pentane (R-601) and isopentane (R-601a).

For the avoidance of doubt, it is to be understood that where a compound may exist as one of two configurational isomers, e.g. cis and trans isomers around a double bond, the use of the term without isomer designation (e.g. R-1234ze) is to refer to either isomer.

The heat transfer portion may comprise tetrafluoropropenes. Preferably, the heat transfer portion comprises R-1234ze, even more preferably the heat transfer portion comprises R-1234ze(E).

The heat transfer composition may comprise R-1234yf.

The heat transfer composition may comprise $CF_3I$.

The heat transfer composition may comprise R-32.

The heat transfer composition may comprise R-32 and R-1234yf.

The heat transfer composition may comprise R-1132a, R-1123 or combinations of one or more of these with R-32.

The heat transfer composition may comprise a hydrocarbon selected from R-170, R-1150, R-1270. R-290, R-600a, R-600, R-601 and R-601a.

The heat transfer composition may comprise R-744.

Some compositions of the invention are less flammable than a composition comprising the same heat transfer portion combined with a polyalkylene glycol (PAG) and/or a polyol ester (POE) based lubricant.

The composition of the invention may be miscible with existing polyalkylene glycol, polyalkylene glycol ester and polyol ester lubricating oils.

The compounds comprising the lubricating portion typically comprise carbon, hydrogen and oxygen, with a ratio of oxygen to carbon sufficient to provide a degree of miscibility with the heat transfer portion, such as when the lubricating portion is added to the heat transfer portion in a proportion of from about 1 to 30 wt %, preferably 1 to 10 wt % and even more preferably 1 to 5 wt % of the total composition, the mixture has one liquid phase. Preferably, the mixture has one liquid phase when 1 to 20 wt % of the lubricating portion is present in the composition. Even more preferably, the composition is one liquid phase regardless of the proportions of the heat transfer portion to the lubricating portion. This solubility or miscibility preferably exists at all normal operating temperatures. For example, the solubility or miscibility exists at least one temperature between −100° C. and +100° C., preferably at least one temperature between −75° C. and +75° C. and even more preferably, at least one temperature between −50° C. and +50° C. Advantageously, the solubility or miscibility exists over all temperature ranges wherein the composition is in the liquid phase.

Conveniently, the compositions of the invention (comprising a compound of formula (I) and a heat transfer compound or heat transfer portion) are less flammable than the heat transfer compound or heat transfer portion alone.

Preferably, the composition of the invention has a lowest temperature of ignition of about 500° C. or greater, such as about 510° C., 520° C., 530° C., 540° C., 550° C., 560° C., 570° C., 580° C., or 590° C., preferably about 600° C. or greater, for example about 610° C., 620° C., 630° C. or 640° C.

Advantageously the compositions of the invention have reduced hygroscopicity compared to heat transfer compositions comprising non-halogenated PAG or polyether lubricants.

The composition of the invention may be non-flammable.

Flammability may be determined in accordance with ASHRAE Standard 34 incorporating the ASTM Standard E-681 with test methodology as per Addendum 34p dated 2004, the entire content of which is incorporated herein by reference.

Conveniently, the Global Warming Potential (GWP) of the compositions of the invention may be less than about 3500, 3000, 2500 or 2000. For instance, the GWP may be less than about 2500, 2400, 2300, 2200, 2100, 2000, 1900, 1800, 1700, 1600 or 1500. The GWP of the compositions of the invention preferably is less than 1400, 1300, 1200, 1100, 1000, 900, 800, 700, 600 or 500.

Preferably, the compositions of the invention have zero or near zero ozone depletion.

The compositions of the invention may have improved heat transfer properties than the heat transfer fluid alone.

Without wishing to be bound by theory, it is believed that compounds of formula (I) may further act as heat transfer agents and therefore increase the heat transfer properties of the compositions of the invention.

The composition may optionally comprise a stabiliser, preferably the stabiliser is selected from diene-based compounds, phosphates, phenol compounds and epoxides, and mixtures thereof.

The composition may optionally comprise a flame retardant. Preferably, the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodo carbon, a fluorinated bromocarbon, trifluoro iodomethane, perfluoroalkyl amines, bromo-fluoroalkyl amines and mixtures thereof.

The composition may also comprise an anti-wear additive, such as tricresyl phosphate.

The composition of the invention may be comprised within a lubricant composition in a proportion of at least about 10 to about 90 wt %, preferably in a proportion of about 10 to about 75 wt %, such as about 10, 20, 30, 40 or 50 wt %.

The invention also provides a heat transfer device containing a composition of the invention and/or the use of a composition of the invention in a heat transfer device.

The heat transfer device may, for example be a refrigeration device.

The heat transfer device may, for example, be selected from the group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

Preferably, the heat transfer device contains a compressor.

In an aspect of the invention, there is provided a method of cooling an article, which comprises condensing a composition of the invention and thereafter evaporating the composition in the vicinity of the article to be cooled.

In a further aspect of the invention, there is provided a method for heating an article, which comprises condensing a composition of the invention in the vicinity of the article to be heated and thereafter evaporating the composition.

In a further aspect of the invention, there is provided a mechanical power generation device containing a composition of the invention.

Preferably, the mechanical power generating device is adapted to use a Rankine Cycle or modification thereof to generate work from heat.

There is also provided a method of retrofitting a heat transfer device comprising the step of removing an existing heat transfer fluid and introducing a composition of the invention. Preferably, the heat transfer device is a refrigeration device. Preferably, the heat transfer device is an air-conditioning system.

There is also provided a method of reducing the flammability of a composition by the addition of a composition of the invention.

Compositions of the invention comprising a heat transfer portion may, for example, be prepared by mixing one or more compounds of formula (I) with a heat transfer fluid.

In an aspect of the invention, the composition may be used as a heat transfer agent. When used as a heat transfer agent, the compositions of the invention may optionally comprise at least two compounds according to formula (I).

In another aspect, the compositions of the invention may be used as lubricants. In a further aspect, the lubricant composition may comprise at least two compounds according to formula (I).

The use of effective amounts of compounds according to formula (I) in a lubricant composition or a heat transfer composition is advantages due to their thermal and mechanical stability, lubricity, viscosity, pour point, anti-oxidation and anti-corrosive properties.

EXAMPLES

The invention is illustrated by the following non-limiting examples.

Compounds according to the invention were synthesised by the following method.

General Method:

An initiator mixture was prepared by adding, with stirring and cooling, a quantity of base (e.g. 85-86% KOH) to an alcohol (e.g. ethylene glycol or trifluoroethanol) in a Pyrex round 25 bottomed flask along with 2-3 drops of Aliquat 336. When the base had dissolved in the alcohol the reaction flask was equipped with a dropping funnel and a condenser before the epoxide monomer (e.g. 3,3,3-trifluoro-1,2-epoxypropane) was added. The mixture was then heated with stirring for a fixed period. At the end of the reaction the product was cooled and dissolved in a minimum quantity of chloroform (e.g. 250 ml). This chloroform solution was washed with acidified water (e.g. 4 g 36% HCl in 100 ml water) and then three times with water alone (e.g. 100 ml). The washed chloroform solution of the polymer product was dried over anhydrous sodium sulphate and after filtration the solvent was removed by distillation at reduced pressure.

The polymer products obtained were analysed and characterised by:

Gel permeation chromatography (GPC): GPC was performed on a Shimadzu Prominence LC system equipped with an RI detector with a 300 mm×75 mm, 5 μm PLgel 100 Å and 300 mm×7.5 mm, 5 μm PLgel 500 Å column in series at 40° C. with a THF eluent at 1.0 ml/min. The method was calibrated with poly(styrene) standards with MW between 1000 and 10000.

Viscometry: Viscometry was performed on a TA Instruments Discovery Hybrid Rheometer using a 40 mm 2.008° cone plate geometry at 10 rad/s between −20 and 70° C.

Using this general method, a series of polymer products were produced. Details for each preparation and key properties of each product are outlined in the Table 1. Table 1 also contains data from a reference example: the commercial refrigeration lubricant Supercool PAG 46.

TABLE 1

Preparative examples

| Example | Recipe Initiator (g) | TFPO (g) | Temperature (° C.) | Yield (g) | Batch time (hrs) | GPC Analysis $M_n$ | $M_w$ | $M_w/M_n$ (PDI) | Viscometry, η (cP) at ° C. −10 | 0 | 20 | 40 | 60 |
|---|---|---|---|---|---|---|---|---|---|---|---|---|---|
| 1 - F(A) | EG 5.7 KOH 1.07 | 130.8 | 70 | 121.2 | 72 | 1078 | 1307 | 1.21 | 27122.2 | 7154.3 | 599.1 | 125.5 | 46.8 |
| 2 - F(B) | EG 5.34 KOH 1.0 | 135.8 | 50 | 118.6 | 72 | 1139 | 1379 | 1.22 | 28106.1 | 7341.6 | 627.7 | 132.4 | 49.3 |
| 3 - F(C) | EG 5.1 KOH 1.1 | 135.0 | 90 | 129.1 | 72 | 2069 | 2399 | 1.16 | 25726.3 | 6904.9 | 613.0 | 134.3 | 49.5 |
| 4 - F(D) | TFEA 1.1 KOH 1.1 | 135.8 | 70 | 127.9 | 48 | 1516 | 1712 | 1.13 | 16917.8 | 4267.3 | 444.0 | 109.4 | 44.5 |
| 5 - F(F) | TFEA 10 KOH 2.0 | 135 | 70 | 86.3 | 48 | 1478 | 1401 | 1.05 | 3066.9 | 824.9 | 130.2 | 40.1 | 18.1 |
| Reference example: Supercool PAG 46 | N/A | N/A | N/A | N/A | N/A | 1141 | 1886 | 1.65 | 568.5 | 271.3 | 84.0 | 37.0 | 21.4 |

Figure 1:
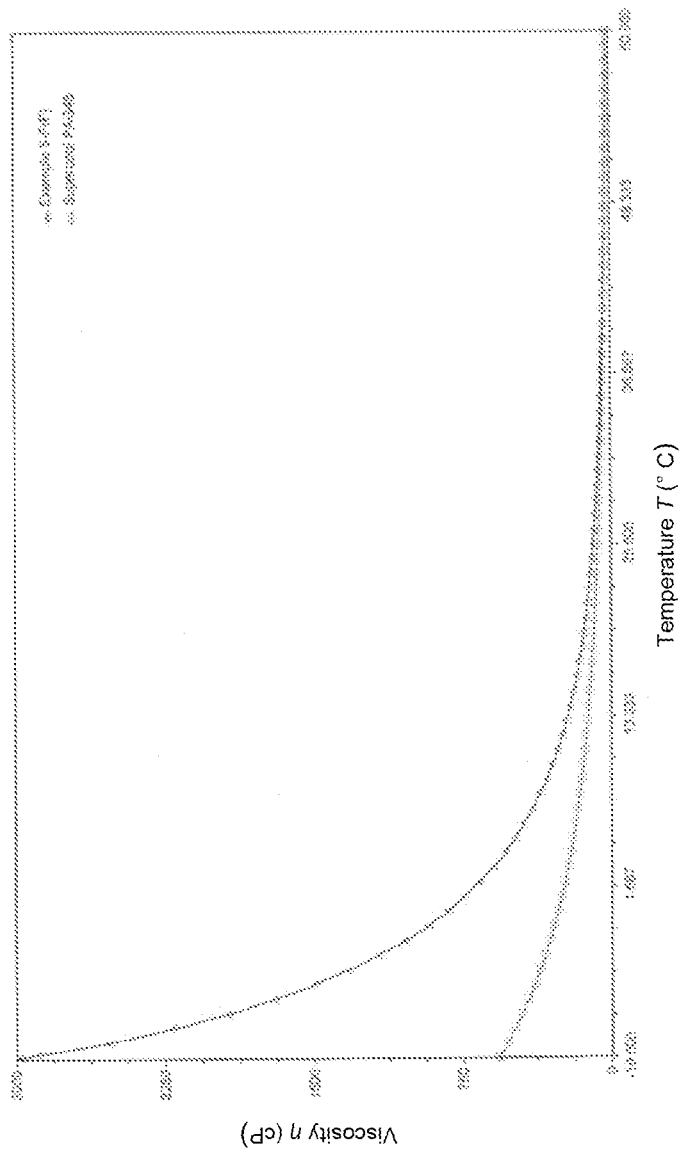
FIG. 1 is a graph showing the viscosity-temperature profile for the reference oil, Supercool PAG 46 (a commercial PAG refrigeration lubricant) and Example 5-F(F).
Figure 2:
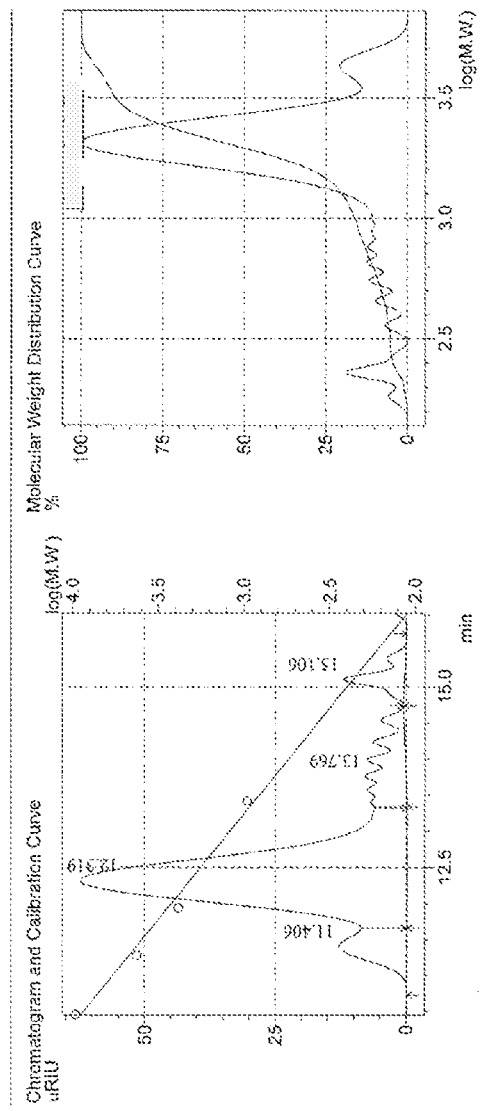
FIG. 2 is the Gel Permeation Chromatography (GPC) analysis of Supercool PAG 46.
Figure 3:
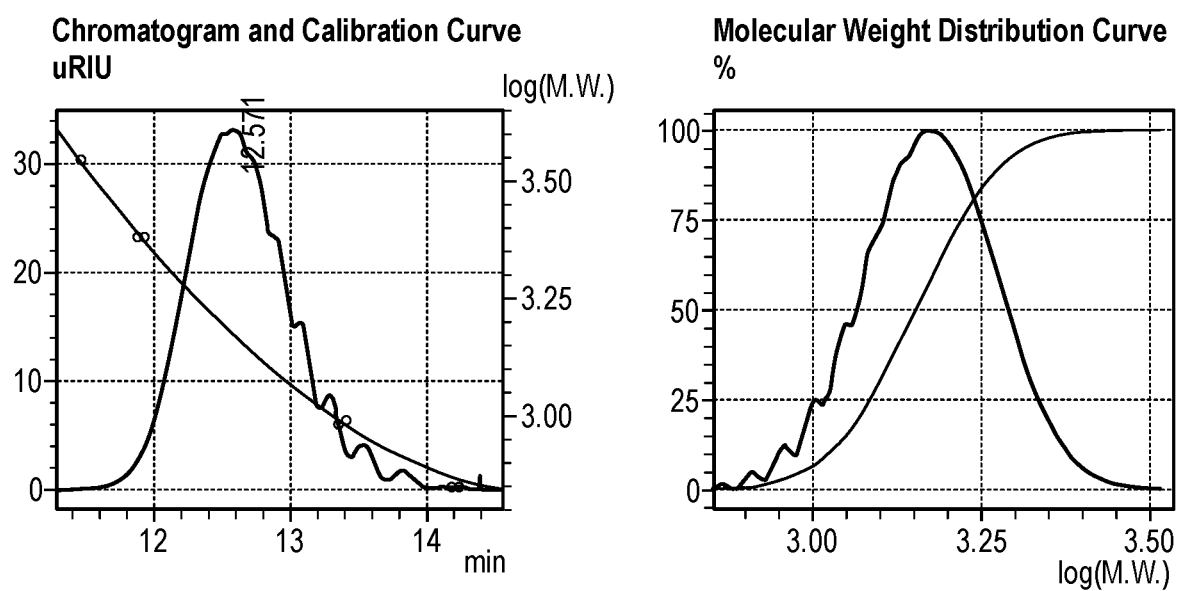
FIG. 3 is the GPC analysis of Example 5-F(F).

*EG = Ethylene glycol, TFEA = trifluoroethanol, TFPO = 3,3,3-trifluoro-2,3-epoxypropane The results clearly show that by using the method of the invention polymers could be simply and easily produced with a significant improvement of molecular weight control ($M_W$ and $M_n$) and polydispersity index (PDI) when compared to the reference example (Supercool PAG 46, a commercial PAG refrigeration lubricant). The properties of the product of example 5-F(F) were particularly good and the viscometry and GPC results for the Reference Example and Example 5-F(F) are shown in FIGS. 1-3.

Vapour-Liquid Equilibria (VLE)

Vapour-liquid equilibria data was measured in a static constant-volume apparatus consisting of a vessel of a precisely known internal volume, located in a temperature-controlled metal block. A magnetic stirring device was located inside the heated vessel. Heat transfer fluid, controlled at a constant temperature, was passed through the block to allow precise control of temperature inside the vessel. The cell was evacuated and then known amounts of each component were charged to the cell. The temperature of the cell was then varied stepwise from about −30° C. to +70° C. At each temperature, the cell temperature and pressure were logged continuously and recorded when stable conditions were reached.

Figure 4:
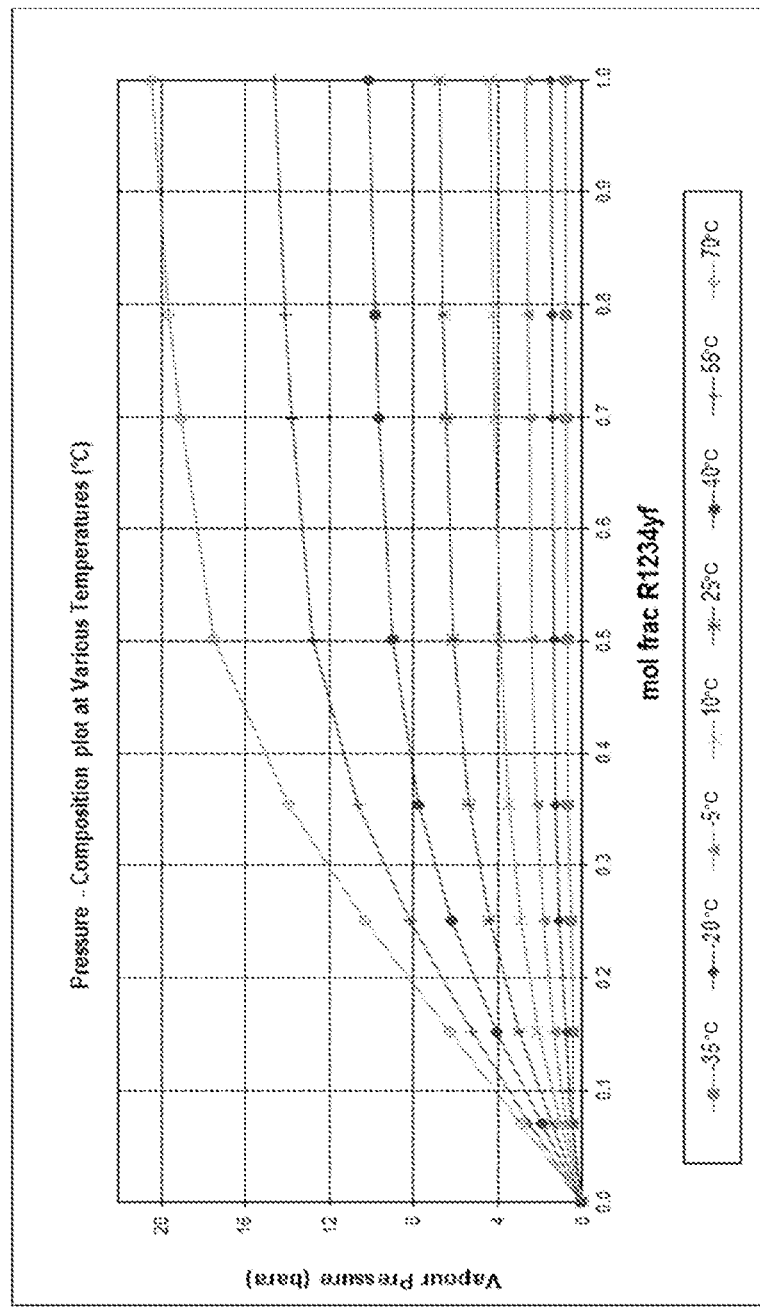
FIG. 4 is the Vapour-Liquid Equilibria data for R-1234yf and Example 5-F(F).

The vapour-liquid equilibria data was measured for R-1234yf and the product of Example 5-F(F), as shown in FIG. 4. The system displays positive deviation from ideal behaviour and the raw experimental data shows that there is no region of liquid-liquid immiscibility over the temperature and composition range studied.

Figure 5:
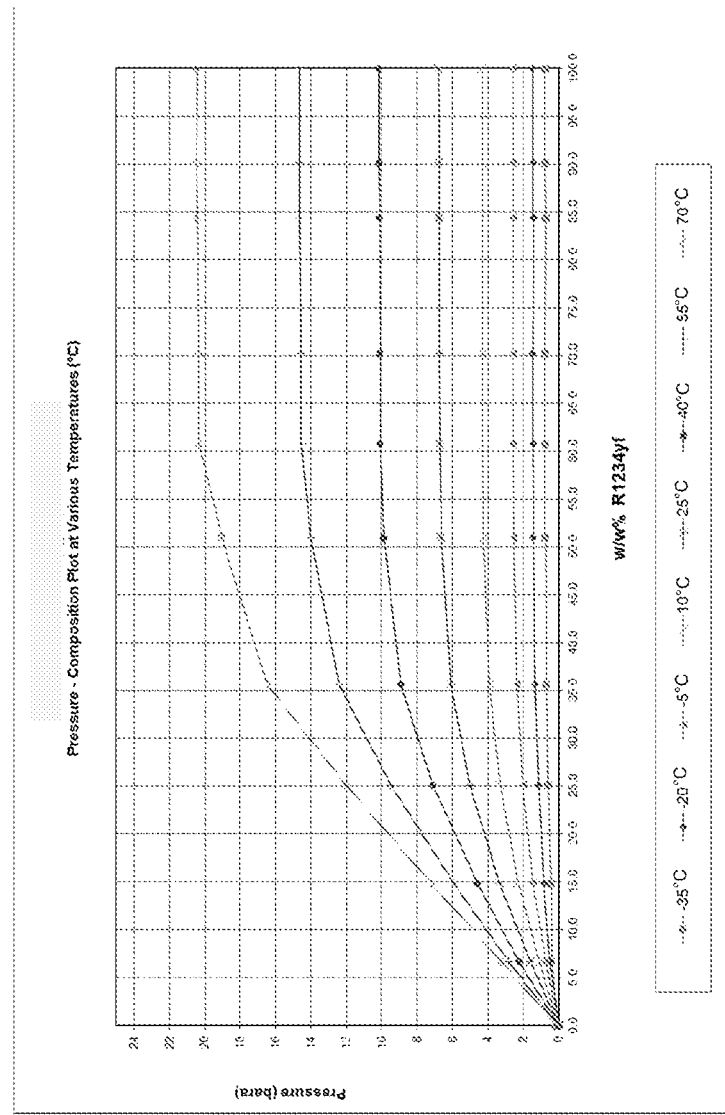
FIG. 5 is the Vapour-Liquid Equilibria data for R-1234yf and Supercool PAG 46 reference oil.

The vapour-liquid equilibria data was measured for R-1234yf and Supercool PAG 46, as shown in FIG. 5. The data shows that a region of liquid-liquid immiscibility may be present for mixtures at compositions 60% w/w R-1234yf and above. Below 50% w/w R-1234yf mixtures, no immiscibility is expected over the temperature range studied.

The results show that the product of Example 5-F(F) and R-1234yf are miscible in all proportions. The same miscibility cannot be seen with the commercial PAG refrigeration lubricant (Supercool PAG 46) and R-1234yf. Therefore, the product of Example 5-F(F) shows better properties than the commercial lubricant.

Example 6

Polymerisations Involving 3,3,3-trifluoro-2-(trifluoromethyl)-1,2-propenoxide (HFIBO)

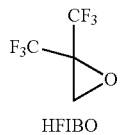

HFIBO

An initiator mixture was prepared by dissolving potassium hydroxide (85%, 0.27 g) in trifluoroethanol (1.25 g) with two drops of Aliquat 336 in a round bottomed flask. The mixture was stirred under cooling until all the KOH pellets had dissolved. Upon dissolution the flask was transferred to a hotplate, equipped with a condenser and 3,3,3-trifluoro-2-(trifluoromethyl)-1,2-propenoxide (16.25 g) added via a dropping funnel. The hotplate was then heated to 70° C. and the mixture began refluxing at 40° C. After refluxing for 24 hours a viscous polymer had formed, and the temperature of the reaction mixture was 60° C. After cooling and washing the polymer was found to dissolve in tetrahydrofuran and was analysed by $^{19}F$ NMR spectroscopy which showed several very broad signals characteristic of polymers at −74.28, −75.08, −76.69 and −78.79 ppm (vs perfluorbenzene at −164.9 ppm). Evaporation of the solvent yielded a viscous white polymer.

Example 7

Polymerisations Involving 75% TFPO and 25% HFIBO

An initiator mixture was prepared by dissolving potassium hydroxide (85%, 0.26 g) in trifluoroethanol (1.25 g) with two drops of Aliquat 336 in a round bottomed flask. The mixture was stirred under cooling until all the KOH pellets had dissolved. Upon dissolution the flask was transferred to a hotplate and 3,3,3-trifluoro-2-(trifluoromethyl)-1,2-propenoxide (5.63 g) and TFPO (10.5 g) was added via a dropping funnel. The hotplate was then heated to 70° C. and the mixture began refluxing at 40° C. the flask was equipped with a chiller supplied condenser. After refluxing for 24 hours a polymer had formed, and the temperature of the reaction mixture was 65° C. After cooling the polymer was washed dissolution was attempted in chloroform, this layer was then washed and dissolved in tetrahydrofuran and analysed by $^{19}F$ NMR spectroscopy which showed several very broad signals characteristic of polymers at −73.61, −74.14, −75.89, −77.17 and −79.32 ppm (vs perfluorbenzene at −164.9 ppm). Evaporation of the solvent yielded a grey coloured polymer.

Comparative Examples

Comparative examples were carried out using a commercial PAG refrigeration lubricant (Supercool PAG 46) and the methods and product of Example 1 of WO 2017/098238.

The results clearly show a significant improvement in molecular weight control and polydispersity index when an initiator of ethylene glycol or trifluoroethanol and potassium hydroxide is used in the absence of solvent, see Table 2.

TABLE 2

Comparative examples

| Experiment | Recipe | | | GPC Analysis | | | Viscometry, η (cP) at ° C. | | | | |
|---|---|---|---|---|---|---|---|---|---|---|---|
| | Initiator (g) | TFPO | Temperature | $M_n$ | $M_w$ | $M_w/M_n$ (PDI) | −10 | 0 | 20 | 40 | 60 |
| Reference example: Supercool PAG 46* | N/A | N/A | N/A | 1141 | 1886 | 1.65 | 568.5 | 271.3 | 84.0 | 37.0 | 21.4 |
| Comparative Example 1: Example 1 WO2017/098238 | t-BuOK 1.3 | 50 | 90 | 4063 | 5964 | 1.47 | 90100.4 | 21873.1 | 2153.7 | 435.7 | 158.4 |
| Comparative Example 2: Solvent free | EG 2.53 t-BuOK 5 | 43.6 | 90 | 3722 | 4303 | 1.16 | 42921.1 | 14167.8 | 1274.1 | 269.97 | 102.9 |
| Comparative Example 3: Solvent free, change alcohol | TFEA 1 t-BuOK 1.16 | 49.4 | 110 | 1469 | 1815 | 1.24 | 10046.3 | 2460.2 | 248.6 | 60.3 | 24.4 |
| Comparative Example 4: Solvent free, change base | EG 1.0 KOH 1.11 | 50 | 89 | 947 | 1118 | 1.18 | 9354.2 | 2403.4 | 261.6 | 60.6 | 23.0 |

*t-BuOK = potassium t-butoxide, EG = Ethylene glycol, TFEA = trifluoroethanol, TFPO = 3,3,3-thfluoro-2,3-epoxypropane Developments of the Method of Preparation and Product of Example 5-F(F)

The procedure described above was used to prepare a series of variants of the product of example 5-F(F) by varying the composition of the initiator mix. Details for each individual preparation and results are presented in Table 3.

In these examples the number of repeating units in the polymer products, n, was estimated by GPC which showed that polymers could be made with n in the range of 6-34 or so.

Lubricating Properties of Polymers

The lubricating properties of the polymer products from the method and product development examples were determined using a TA Instruments Discovery Hybrid Rheometer by measuring the co-efficient of friction between a rotating ball bearing and three fixed ball bearings at 25° C. at different sliding speeds as a function of axial force, see Table 4.

The results confirm that the polymers of the invention are excellent lubricants on a par with Supercool PAG 46, which is a fully formulated commercial lubricant whose formulation includes additives designed to aid lubricity.

TABLE 3

Development of the method of preparation and product of Example 5 - F(F)

| Example | TFEA (g) | KOH (g) | TFPO (g) | Polymer yield (g) | $M_w$ | $M_n$ | PDI | n (GPC) | n at −10° C. (cP) | n at −0° C. (cP) | n at 20° C. (cP) | n at 40° C. (cP) | n at 60° C. (cP) |
|---|---|---|---|---|---|---|---|---|---|---|---|---|---|
| 5 - F(F) | 10 | 2 | 135 | 86.3 | 1478 | 1401 | 1.05 | 11 | 3066.9 | 824.9 | 130.2 | 40.1 | 18.1 |
| 5 - F(F) Scale up** | 22.3 | 4.54 | 300 | 280 | 1706 | 1615 | 1.06 | 13 | 6548.0 | 1532.5 | 231.7 | 62.3 | 25.7 |
| 1a | 5 | 1 | 65 | 39 | 1217 | 1154 | 1.05 | 9 | 829.2 | 263.5 | 53.0 | 18.4 | 8.8 |
| 2a | 5 | 0.29 | 65 | 49.63 | 1403 | 1335 | 1.05 | 11 | 2491.9 | 683.5 | 113.0 | 35.2 | 15.7 |
| 3a | 5 | 1 | 65.4 | 52.6 | 1463 | 1385 | 1.06 | 11 | 2731.7 | 740.3 | 119.6 | 36.8 | 16.3 |
| 4a | 8.45 | 1 | 65 | 51.6 | 1036 | 995 | 1.04 | 7 | 335.8 | 121.9 | 29.2 | 11.0 | 5.4 |
| 5a | 1.46 | 1 | 65 | 26.4 | 4032 | 3504 | 1.15 | 34 | 45437.0 | 12200.9 | 1113.8 | 235.2 | 87.1 |

TABLE 3-continued

Development of the method of preparation and product of Example 5 - F(F)

| Example | TFEA (g) | KOH (g) | TFPO (g) | Polymer yield (g) | $M_w$ | $M_n$ | PDI | n (GPC) | n at −10° C. (cP) | n at −0° C. (cP) | n at 20° C. (cP) | n at 40° C. (cP) | n at 60° C. (cP) |
|---|---|---|---|---|---|---|---|---|---|---|---|---|---|
| 6a | 7.5 | 1.5 | 65 | 65 | 1280 | 1217 | 1.05 | 10 | 1391.4 | 414.3 | 76.1 | 25.1 | 11.8 |
| 7a | 7.5 | 0.5 | 64.93 | 25.2 | 842 | 825 | 1.02 | 6 | 73.6 | 33.3 | 10.1 | 4.3 | 2.1 |
| 7b | 7.5 | 0.5 | 64.93 | 25.2 | 929 | 902 | 1.03 | 6 | 187.9 | 75.9 | 20.5 | 8.3 | 4.2 |
| 8a | 5 | 1 | 65.3 | 53.1 | 1486 | 1408 | 1.06 | 11 | 2749.2 | 740.0 | 113.8 | 34.7 | 15.2 |
| 9a | 2.5 | 1.5 | 65.1 | 55.5 | 2756 | 2578 | 1.07 | 23 | 22562.1 | 5398.8 | 528.5 | 121.9 | 46.2 |
| 10a | 5 | 1.71 | 64.9 | 57.71 | 1648 | 1554 | 1.06 | 13 | 4256.9 | 1050.4 | 149.2 | 43.1 | 18.9 |
| 11a | 5 | 1 | 65 | 52.5 | 1419 | 1340 | 1.06 | 11 | 2390.8 | 629.0 | 102.1 | 31.8 | 14.1 |
| 12a | 5 | 1 | 65 | 57.1 | 1530 | 1444 | 1.06 | 12 | 2939.4 | 786.9 | 129.9 | 38.0 | 16.4 |
| 13a | 2.5 | 0.5 | 65 | 39.73 | 2024 | 1910 | 1.06 | 16 | 10415.6 | 2408.8 | 311.3 | 81.8 | 33.0 |

*TFEA = trifluoroethanol, TFPO = 3,3,3-trifluoro-2,3-epoxypropane

**Because of the larger scale of this example the method was adapted. Thus, the initiator mix was prepared and heated to 70°C and then the TFPO was added over 3-4 hours

TABLE 4

Lubricity of polymers from method and product development study

| Polymer example | Axial force (N) | Coefficient of friction (μ) at sliding speed (μm/sec): | | | |
|---|---|---|---|---|---|
| | | 20000 | 40000 | 60000 | 80000 |
| Reference example: Supercool PAG 46 | 5 | 0.097 | 0.096 | 0.095 | 0.094 |
| | 10 | 0.103 | 0.100 | 0.098 | 0.096 |
| | 15 | 0.105 | 0.101 | 0.098 | 0.096 |
| | 20 | 0.107 | 0.102 | 0.100 | 0.098 |
| | 25 | 0.108 | 0.104 | 0.102 | 0.100 |
| | 30 | 0.110 | 0.107 | 0.104 | 0.103 |
| | 35 | 0.112 | 0.109 | 0.107 | 0.105 |
| | 40 | 0.113 | 0.111 | 0.109 | 0.107 |
| 5-F(F) | 5 | 0.104 | 0.104 | 0.104 | 0.103 |
| | 10 | 0.114 | 0.104 | 0.106 | 0.106 |
| | 15 | 0.118 | 0.099 | 0.104 | 0.106 |
| | 20 | 0.120 | 0.104 | 0.106 | 0.106 |
| | 25 | 0.121 | 0.121 | 0.115 | 0.116 |
| | 30 | 0.121 | 0.121 | 0.120 | 0.119 |
| | 35 | 0.120 | 0.120 | 0.119 | 0.118 |
| | 40 | 0.120 | 0.120 | 0.119 | 0.117 |
| 5 - F(F) Scale up | 5 | 0.101 | 0.099 | 0.097 | 0.097 |
| | 10 | 0.107 | 0.105 | 0.103 | 0.103 |
| | 15 | 0.111 | 0.110 | 0.109 | 0.109 |
| | 20 | 0.114 | 0.113 | 0.113 | 0.112 |
| | 25 | 0.116 | 0.116 | 0.116 | 0.114 |
| | 30 | 0.118 | 0.118 | 0.118 | 0.117 |
| | 35 | 0.119 | 0.120 | 0.120 | 0.118 |
| | 40 | 0.121 | 0.121 | 0.120 | 0.119 |
| 1a | 5 | 0.102 | 0.101 | 0.101 | 0.100 |
| | 10 | 0.109 | 0.108 | 0.107 | 0.106 |
| | 15 | 0.110 | 0.108 | 0.106 | 0.105 |
| | 20 | 0.109 | 0.107 | 0.106 | 0.105 |
| | 25 | 0.109 | 0.108 | 0.107 | 0.106 |
| | 30 | 0.111 | 0.109 | 0.108 | 0.108 |
| | 35 | 0.112 | 0.111 | 0.110 | 0.108 |
| | 40 | 0.112 | 0.111 | 0.109 | 0.108 |
| 2a | 5 | 0.104 | 0.103 | 0.102 | 0.101 |
| | 10 | 0.109 | 0.108 | 0.106 | 0.105 |
| | 15 | 0.110 | 0.108 | 0.107 | 0.106 |
| | 20 | 0.111 | 0.109 | 0.108 | 0.107 |
| | 25 | 0.112 | 0.111 | 0.110 | 0.109 |
| | 30 | 0.113 | 0.112 | 0.111 | 0.111 |
| | 35 | 0.114 | 0.114 | 0.113 | 0.112 |
| | 40 | 0.115 | 0.115 | 0.115 | 0.114 |
| 3a | 5 | 0.106 | 0.106 | 0.105 | 0.105 |
| | 10 | 0.113 | 0.111 | 0.110 | 0.109 |
| | 15 | 0.115 | 0.114 | 0.112 | 0.111 |
| | 20 | 0.117 | 0.116 | 0.115 | 0.114 |
| | 25 | 0.119 | 0.118 | 0.117 | 0.116 |
| | 30 | 0.120 | 0.119 | 0.118 | 0.117 |
| | 35 | 0.121 | 0.120 | 0.119 | 0.118 |
| | 40 | 0.121 | 0.120 | 0.120 | 0.119 |
| 4a | 5 | 0.093 | 0.091 | 0.089 | 0.088 |
| | 10 | 0.102 | 0.098 | 0.096 | 0.094 |
| | 15 | 0.105 | 0.101 | 0.099 | 0.098 |
| | 20 | 0.108 | 0.105 | 0.103 | 0.102 |
| | 25 | 0.111 | 0.108 | 0.106 | 0.105 |
| | 30 | 0.113 | 0.109 | 0.107 | 0.106 |
| | 35 | 0.114 | 0.110 | 0.108 | 0.107 |
| | 40 | 0.115 | 0.111 | 0.110 | 0.108 |
| 5a | 5 | 0.102 | 0.098 | 0.096 | 0.096 |
| | 10 | 0.111 | 0.114 | 0.118 | 0.118 |
| | 15 | 0.121 | 0.124 | 0.127 | 0.125 |
| | 20 | 0.129 | 0.130 | 0.130 | 0.129 |
| | 25 | 0.132 | 0.134 | 0.133 | 0.132 |
| | 30 | 0.134 | 0.136 | 0.135 | 0.134 |
| | 35 | 0.136 | 0.138 | 0.137 | 0.136 |
| | 40 | 0.137 | 0.139 | 0.138 | 0.136 |
| 6a | 5 | 0.097 | 0.096 | 0.095 | 0.095 |
| | 10 | 0.107 | 0.105 | 0.103 | 0.102 |
| | 15 | 0.110 | 0.109 | 0.108 | 0.106 |
| | 20 | 0.113 | 0.112 | 0.111 | 0.110 |
| | 25 | 0.115 | 0.114 | 0.113 | 0.113 |
| | 30 | 0.116 | 0.116 | 0.115 | 0.114 |
| | 35 | 0.118 | 0.117 | 0.117 | 0.116 |
| | 40 | 0.119 | 0.119 | 0.118 | 0.117 |
| 7a | 5 | 0.109 | 0.104 | 0.102 | 0.100 |
| | 10 | 0.116 | 0.110 | 0.107 | 0.105 |
| | 15 | 0.118 | 0.113 | 0.110 | 0.107 |
| | 20 | 0.124 | 0.117 | 0.114 | 0.111 |
| | 25 | 0.129 | 0.122 | 0.117 | 0.115 |
| | 30 | 0.132 | 0.125 | 0.120 | 0.116 |
| | 35 | 0.132 | 0.124 | 0.120 | 0.117 |
| | 40 | 0.133 | 0.124 | 0.120 | 0.118 |
| 7b (7a repeat) | 5 | 0.094 | 0.092 | 0.091 | 0.091 |
| | 10 | 0.101 | 0.085 | 0.086 | 0.085 |
| | 15 | 0.104 | 0.102 | 0.101 | 0.100 |
| | 20 | 0.107 | 0.104 | 0.103 | 0.102 |
| | 25 | 0.109 | 0.107 | 0.105 | 0.104 |
| | 30 | 0.111 | 0.109 | 0.107 | 0.107 |
| | 35 | 0.113 | 0.110 | 0.109 | 0.108 |
| | 40 | 0.114 | 0.110 | 0.109 | 0.108 |
| 8a | 5 | 0.113 | 0.113 | 0.113 | 0.113 |
| | 10 | 0.114 | 0.114 | 0.114 | 0.114 |
| | 15 | 0.115 | 0.115 | 0.115 | 0.115 |
| | 20 | 0.116 | 0.116 | 0.115 | 0.115 |
| | 25 | 0.119 | 0.118 | 0.117 | 0.115 |
| | 30 | 0.118 | 0.117 | 0.116 | 0.115 |
| | 35 | 0.118 | 0.117 | 0.116 | 0.116 |
| | 40 | 0.118 | 0.118 | 0.117 | 0.116 |
| 9a | 5 | 0.113 | 0.115 | 0.116 | 0.116 |
| | 10 | 0.123 | 0.125 | 0.125 | 0.126 |
| | 15 | 0.127 | 0.129 | 0.129 | 0.129 |
| | 20 | 0.130 | 0.131 | 0.131 | 0.130 |

TABLE 4-continued

Lubricity of polymers from method and product development study

| Polymer example | Axial force (N) | Coefficient of friction (μ) at sliding speed (μm/sec): | | | |
|---|---|---|---|---|---|
| | | 20000 | 40000 | 60000 | 80000 |
| | 25 | 0.133 | 0.134 | 0.133 | 0.131 |
| | 30 | 0.134 | 0.136 | 0.135 | 0.133 |
| | 35 | 0.136 | 0.137 | 0.136 | 0.134 |
| | 40 | 0.137 | 0.138 | 0.137 | 0.135 |
| 10a | 5 | 0.103 | 0.104 | 0.104 | 0.103 |
| | 10 | 0.110 | 0.111 | 0.111 | 0.111 |
| | 15 | 0.113 | 0.113 | 0.113 | 0.112 |
| | 20 | 0.115 | 0.115 | 0.114 | 0.113 |
| | 25 | 0.114 | 0.112 | 0.112 | 0.113 |
| | 30 | 0.117 | 0.118 | 0.117 | 0.116 |
| | 35 | 0.119 | 0.119 | 0.118 | 0.117 |
| | 40 | 0.119 | 0.119 | 0.118 | 0.118 |
| 11a | 5 | 0.113 | 0.112 | 0.112 | 0.112 |
| | 10 | 0.114 | 0.114 | 0.113 | 0.113 |
| | 15 | 0.115 | 0.114 | 0.114 | 0.113 |
| | 20 | 0.115 | 0.115 | 0.114 | 0.113 |
| | 25 | 0.116 | 0.116 | 0.115 | 0.114 |
| | 30 | 0.117 | 0.117 | 0.116 | 0.115 |
| | 35 | 0.118 | 0.117 | 0.117 | 0.116 |
| | 40 | 0.118 | 0.118 | 0.117 | 0.116 |
| 12a | 5 | 0.101 | 0.102 | 0.102 | 0.102 |
| | 10 | 0.109 | 0.109 | 0.109 | 0.108 |
| | 15 | 0.112 | 0.112 | 0.111 | 0.110 |
| | 20 | 0.115 | 0.114 | 0.113 | 0.113 |
| | 25 | 0.116 | 0.116 | 0.115 | 0.114 |
| | 30 | 0.117 | 0.117 | 0.116 | 0.115 |
| | 35 | 0.118 | 0.117 | 0.117 | 0.116 |
| | 40 | 0.118 | 0.118 | 0.117 | 0.116 |
| 13a | 5 | 0.117 | 0.119 | 0.120 | 0.120 |
| | 10 | 0.120 | 0.121 | 0.121 | 0.121 |
| | 15 | 0.122 | 0.122 | 0.122 | 0.121 |
| | 20 | 0.124 | 0.123 | 0.123 | 0.123 |
| | 25 | 0.125 | 0.125 | 0.125 | 0.124 |
| | 30 | 0.125 | 0.126 | 0.126 | 0.125 |
| | 35 | 0.126 | 0.126 | 0.126 | 0.126 |
| | 40 | 0.126 | 0.127 | 0.127 | 0.126 |

The invention claimed is:

1. A compound according to formula (Ia) or formula (Ib);

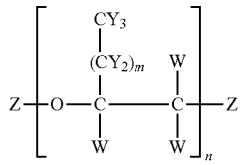

Formula (Ia)

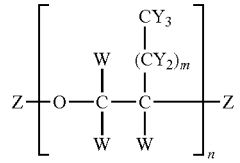

Formula (Ib)

wherein
each W is independently selected from the group consisting of H, F, Cl, Br, I, and $(CY_2)_mCY_3$, provided that at least one W in the compound according to formula (Ia) is $(CY_2)_mCY_3$;
each Y is independently selected from the group consisting of F, Cl, Br, and I;
each Z is independently selected from the group consisting of H, OH, $(CW_2)_pCW_3$, $CY_3$, $OCW_3$, $O(CW_2)_pCW_3$, $OCW((CY_2)_mCY_3)CWCW_2$, $(CW_2)_pOH$, polyalkylene glycol ("PAG"), and polyester;
n is an integer from 2 to 49;
m is an integer from 0 to 3;
p is an integer from 0 to 9;
the molecule weight average (Mw) is ≤5500; and
the polydispersity index is ≤1.45.

2. The compound according to claim 1 wherein
each W in the compound according to formula (Ib) is independently selected from the group consisting of H, F, Cl, Br, and I; and
each Z is independently selected from the group consisting of H, OH, $(CW_2)_pCW_3$, $CY_3$, $OCW_3$, $O(CW_2)_pCW_3$, $OCW((CY_2)_mCY_3)CWCW_2$, polyalkylene glycol (PAG), and polyolester.

3. The compound according to claim 1 wherein the Mw is ≤4000.

4. The compound according to claim 1 wherein the polydispersity index is about 1.40.

5. The compound according to claim 1, wherein Y is F or Cl; and/or wherein W is H, F, Cl, or $(CY_2)_mCY_3$.

6. The compound according to claim 1, wherein one W group is $(CY_2)_mCY_3$, two W groups are H, Y is F, and m is 0.

7. The compound according to claim 1, wherein one or two W groups are F, one or two W groups are H, Y is F, and m is 0.

8. The compound according to claim 7, wherein one W group is F, and two W groups are H.

9. The compound according to claim 1, wherein Z comprises a polyalkylene glycol (PAG).

10. The compound according to claim 1, wherein at least one Z is not H or OH.

11. The compound according to claim 1, wherein at least one Z comprises a fluorinated-polyalkylene glycol ("F-PAG").

12. The compound according to claim 1, wherein n is an integer from 2 to 25; and/or wherein m is 0; and/or wherein p is 1 to 6.

13. The compound according to claim 1 having a viscosity at 40° C. of from about 5 to about 250 cP.

14. A composition comprising at least two different compounds of formula (Ia) and/or (Ib) as defined in claim 1.

15. A composition comprising one or more compounds of formula (Ia) and/or (Ib) as defined in claim 1 and a heat transfer portion.

16. The composition according to claim 14, wherein the weight percentage of the compound or compounds of formula (Ia) and/or (Ib) in the composition is 1 to 30%.

17. The composition according to claim 15, wherein the heat transfer portion comprises one or more compounds selected from the group consisting of (hydro)fluoroolefins (HFOs), hydrofluorocarbons (HFCs), chlorofluorocarbons (CFCs), hydrochlorofluorocarbons (HCFCs), perfluoroalkyl iodides, and hydrocarbons.

18. The composition according to claim 15, wherein the heat transfer portion comprises R-32, R-152a, $CF_3I$, R-1234ze, R-1234f, R-1132a, R-1123, R-744, R-290, and/or R-600a.

19. The composition according to claim 14, further comprising a stabiliser.

20. The composition according to claim 15, which comprises a single liquid phase across the entire temperature range between −30° C. and 70° C.

21. A method for making the compound of formula (Ia) and/or formula (Ib), according to claim 1, comprising polymerizing an epoxide with an initiator formed from a base and an alcohol.

22. The method according to claim 21, wherein the base is a group I or group II metal hydroxide.

23. The method according to claim 22, wherein the alcohol is a primary alcohol.

24. The method according to claim 21, comprising polymerizing the epoxide in an absence of a solvent.

25. The method according to claim 21, wherein the polymerizing is carried out at a temperature of from about 0° C. to about 130° C.

26. The method according to claim 21, wherein the polymerizing is carried out at a pressure of from about 00 to about 1000.3 kPa.

27. The method according to claim 21 wherein the polymerizing is of an epoxide selected from the group consisting of an epoxide of 3,3,3-trifluoropropene (1243zf), an epoxide of 2,3,3,3-tetrafluoropropene (1234yf), an epoxide of 1,3,3,3-tetrafluoropropene (1234ze), an epoxide of 1,1,1,4,4,4-hexafluoro-2-butene (1336mzz), and 3,3,3-trifluoro-2-(trifluoromethyl)-1,2-propenoxide (HFIBO).

28. A heat transfer device comprising the composition according to claim 14.

* * * * *

UNITED STATES PATENT AND TRADEMARK OFFICE
CERTIFICATE OF CORRECTION

| | |
|---|---|
| PATENT NO. | : 11,603,433 B2 |
| APPLICATION NO. | : 17/415525 |
| DATED | : March 14, 2023 |
| INVENTOR(S) | : Andrew Sharratt |

It is certified that error appears in the above-identified patent and that said Letters Patent is hereby corrected as shown below:

In the Specification

Column 3, Line 54, delete "51.45" and insert in its place --1.45--.

Column 10, Line 34, delete "25".

Signed and Sealed this
Twenty-third Day of May, 2023

Katherine Kelly Vidal
*Director of the United States Patent and Trademark Office*